United States Patent
Smith et al.

(10) Patent No.: US 7,949,705 B1
(45) Date of Patent: May 24, 2011

(54) DYNAMIC DESKTOP SWITCHING FOR THIN CLIENTS

(75) Inventors: Randall B. Smith, Palo Alto, CA (US); Kristen A. McIntyre, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1403 days.

(21) Appl. No.: 10/867,098

(22) Filed: Jun. 14, 2004

(51) Int. Cl.
*G06F 15/16* (2006.01)

(52) U.S. Cl. ......... 709/203; 345/536; 345/539; 345/545

(58) Field of Classification Search .................. None
See application file for complete search history.

(56) References Cited

U.S. PATENT DOCUMENTS

| | | | | |
|---|---|---|---|---|
| 5,142,275 | A * | 8/1992 | Rockel | 345/635 |
| 6,970,173 | B2 * | 11/2005 | Ciolac | 345/544 |
| 7,019,752 | B1 * | 3/2006 | Paquette et al. | 345/543 |
| 2002/0065879 | A1 * | 5/2002 | Ambrose et al. | 709/203 |
| 2003/0229900 | A1 * | 12/2003 | Reisman | 725/87 |
| 2004/0049530 | A1 * | 3/2004 | Lok et al. | 709/201 |
| 2005/0055419 | A1 * | 3/2005 | Oh | 709/213 |
| 2005/0256923 | A1 * | 11/2005 | Adachi | 709/203 |

* cited by examiner

*Primary Examiner* — Yves Dalencourt
*Assistant Examiner* — Michael C Lai
(74) *Attorney, Agent, or Firm* — Osha • Liang LLP

(57) ABSTRACT

A method for viewing a desktop on a first client involves initiating a first desktop session and a second desktop session, populating a first virtual frame buffer (VFB) using the first desktop session, populating a second VFB using the second desktop session, storing an extended virtual frame buffer (EVFB) using the first VFB and the second VFB, and selecting a first portion of the EVFB to view on the desktop using a first VFB scout.

25 Claims, 3 Drawing Sheets

DYNAMIC DESKTOP SWITCHING FOR THIN CLIENTS

BACKGROUND

With the advent of high bandwidth network connections, thin client desktops are becoming increasingly popular. In a thin client system, the client contains limited resources (i.e., memory, processors, etc.). More specifically, the user's desktop in a thin client system typically runs on a host (i.e., server), which is a larger machine in a server room, while the user's own computer receives only a picture (i.e., graphical image) of the actual desktop session, which is shipped over the network to the thin client's display. The thin client uses the processing power of the server to manipulate an application or perform particular input functions.

A single server may host several desktop sessions, each of which includes a virtual frame buffer. The virtual frame buffer communicates over the network to a client to display graphics on the client via the client's frame buffer. The frame buffer is a buffer that is connected to the client's display so that the application graphics (i.e., text or images within one or more windows) appear on the screen.

Additionally, the thin client may initiate one or more desktop sessions, with each session including one or more applications. Typically, each desktop sessions appears on the thin client as a separate window. The actions performed by the thin client are subsequently relayed back to the server hosting the particular desktop session, where the actual manipulation of applications or objects takes place. In this manner, graphics associated with one or more applications ultimately are displayed on the client's screen, but the software (i.e., back-end logic) to manipulate the application(s) or graphics resides on the server. For example, if the thin client uses a mouse to click on a particular icon on the desktop, the mouse click is translated back to the server. The server then performs the action, and only the new display (i.e., subsequent to performing the action) is captured before being displayed on the server's virtual frame buffer and is presented on the thin client's frame buffer. Typically, one virtual frame buffer exists for each desktop session running on the server for each user.

Conventionally, having multiple desktop sessions initiated on a thin client does not allow the user to view more than one desktop session simultaneously. This is because each desktop session is viewed individually on different windows or separate screens. For example, a remote desktop session may appear entirely within a single window on the thin client. Therefore, to view another desktop session, the client may initiate another window. In some instances, having one new window for each desktop session may not be feasible. Further, switching between multiple desktop sessions (with each possibly running a different operating system) can become a tedious task when each desktop sessions is displayed in this manner.

SUMMARY

In general, in one aspect, an embodiment the invention involves a method for viewing a desktop on a first client. The method comprises initiating a first desktop session and a second desktop session, populating a first virtual frame buffer (VFB) using the first desktop session, populating a second VFB using the second desktop session, storing an extended virtual frame buffer (EVFB) using the first VFB and the second VFB, and selecting a first portion of the EVFB to view on the desktop using a first VFB scout.

In general, in one aspect, an embodiment the invention involves a system. The system comprises a first server configured to host a first desktop session and a second desktop session, wherein the first desktop session is associated with a first virtual frame buffer (VFB) and the second desktop session is associated with a second VFB, an extended virtual frame buffer (EVFB) service including an extended virtual frame buffer (EVFB) configured to store a copy of the first VFB and a copy of the second VFB, and a first client configured to display a first portion of the EVFB, wherein the first portion is selected by a first VFB scout.

In general, in one aspect, an embodiment the invention involves a computer system for viewing a desktop. The computer system comprises a processor, a memory, a storage device, and software instructions. The software instructions are stored in the memory for enabling the computer system under control of the processor, to initiate a first desktop session and a second desktop session, populate a first virtual frame buffer (VFB) using the first desktop session, populate a second VFB using the second desktop session, storing an extended virtual frame buffer (EVFB) with the first VFB and the second VFB, and select a portion of the EVFB to view using a VFB scout.

In general, in one aspect, an embodiment the invention involves a plurality of nodes. The plurality of nodes comprise a server configured to host a first desktop session and a second desktop session, wherein the first desktop session is associated with a first virtual frame buffer (VFB) and the second desktop session is associated with a second VFB, an extended virtual frame buffer (EVFB) service comprising an extended virtual frame buffer (EVFB) configured to store a copy of the first VFB and a copy of the second VFB, and a client configured to display a portion of the EVFB, wherein the portion is selected by a VFB scout, wherein the server is located on any one of the plurality of nodes, wherein the EVFB service is located on any one of the plurality of nodes, and wherein the client is located on any one of the plurality of nodes.

Other aspects of the invention will be apparent from the following description and the appended claims.

DETAILED DESCRIPTION

Figure 1:
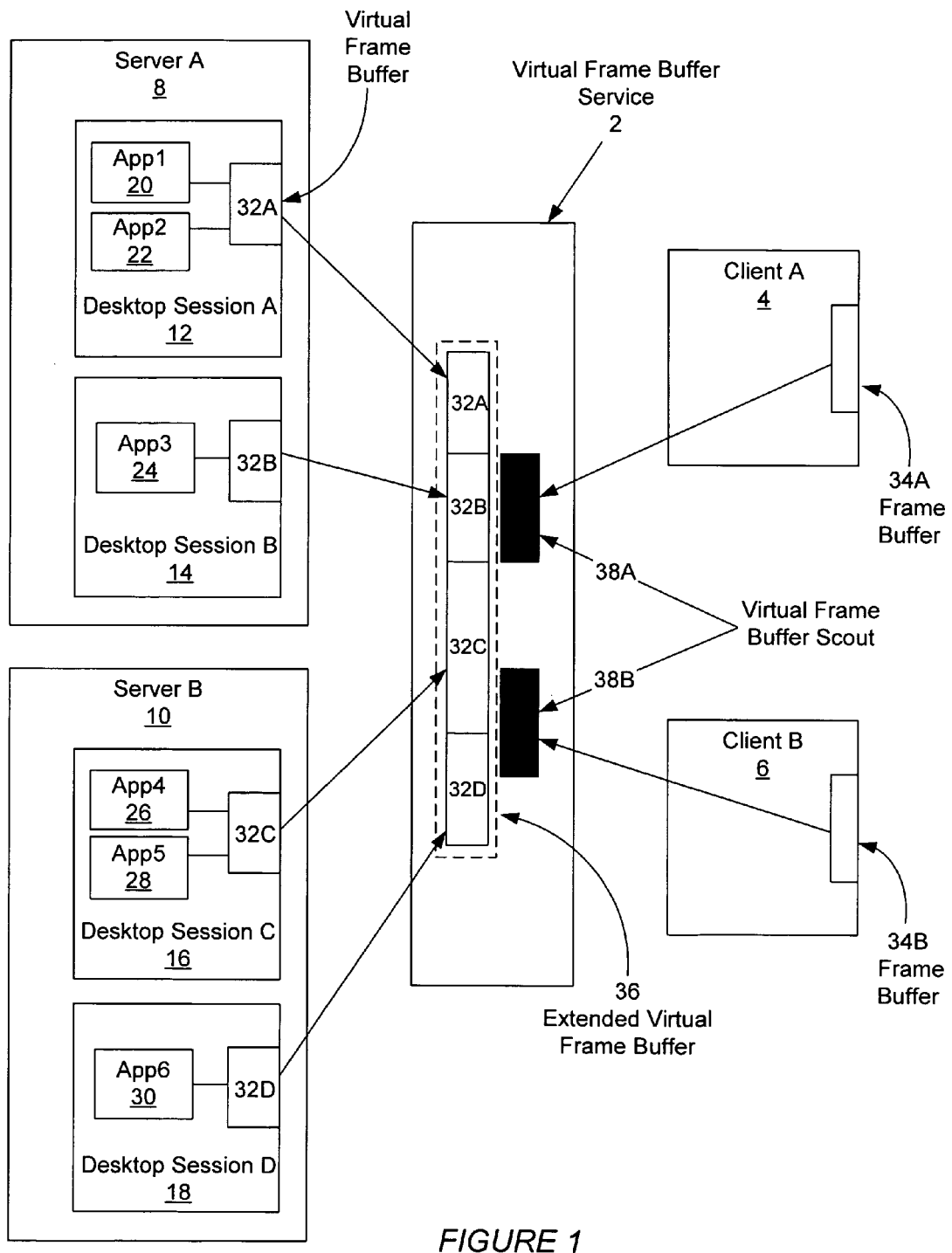
FIG. 1 shows a system for dynamically switching desktop sessions in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a system and method for viewing multiple desktop sessions on a network system. Specifically, embodiments of the invention use an extended virtual frame buffer service to provide the interface between a server capable of hosting several desktop sessions and thin clients that initiate one or more desktop sessions on the server. Further, embodiments of the invention provide a thin client with the ability to dynamically switch from one desktop session to another desktop session.

FIG. 1 shows a system for dynamically switching desktop sessions in accordance with one embodiment of the invention. In one embodiment of the invention, the system includes an extended virtual frame buffer (EVFB) service (2), one or more servers (Server A (8), Server B (10)), and one or more clients (Client A (4), Client B (6)). Each server may include one or more desktop sessions (Desktop Session A (12), Desktop Session B (14), Desktop Session C (16), Desktop Session D (18)), which may run multiple applications (App1 (20), App2 (22), App3 (24), App4 (26), App5 (28), App6 (30)) that may be manipulated by the client. Further, each desktop session (12, 14, 16, 18) includes a virtual frame buffer (32A, 32B, 32C, 32D) used to display the contents of the desktop session (12, 14, 16, 18). Similarly, each client (4, 6) may include a frame buffer (34A, 34B), which is used to display the contents of the desktop session (12, 4, 16, 18) to a user. One skilled in the art will appreciate that the clients shown in FIG. 1 may be thin clients.

In one embodiment of the invention, the EVFB service (2) interfaces between the servers (8, 10) and the clients (4, 6) to provide an extended virtual frame buffer (EVFB) (36). The EVFB (36) is a collection of all the displays of each desktop session (12, 14, 16, 18) running on all the servers (8, 10) that are connected to the EVFB service (2). More specifically, in one embodiment of the invention, each server replicates the contents of the virtual frame buffer associated with a particular desktop session onto the EVFB in the EVFB service. Moreover, the client may connect to the EVFB service to view desktop sessions.

For example, referring to FIG. 1, Server A (8) may replicate the contents of the virtual frame buffer (32A) associated with Desktop Session A (12) onto a portion of the EVFB (36) (e.g., the portion labeled 32A on the EVFB (36)). In one embodiment of the invention, Client A (4) may view Desktop Session A (12) via a virtual frame buffer (VFB) scout (38A) associated with the Client A (4). The VFB scout (38A) acts as a viewer that Client A (4) may manipulate to perform actions (i.e., click a button using a mouse, perform a keystroke using the keyboard, etc.) on Desktop Session A (12). Further, the VFB scout (38A) allows Client A (4) to switch between desktop sessions (12, 14, 16, 18) available via the EVFB service (2).

One skilled in the art will appreciate that the client may connect to one particular part of the EVFB service or to the EVFB service as a whole. One skilled in the art will also appreciate that the desktop sessions used by a client may all reside on the same physical server or several different servers.

In one embodiment of the invention, each server may populate the EVFB with the content of a virtual frame buffer (associated with a desktop session) before a client connects to the EVFB service. Alternatively, the EVFB may be populated with the content of desktop sessions while clients are using various desktop sessions. In this case, the EVFB may be constantly populating with updated content in the background, while clients are connected to the EVFB service.

One skilled in the art will appreciate that the EVFB service may run on any existing machine (i.e., an existing server or client) or on a separate machine (i.e., the EVFB may run on its own server). Additionally, the EVFB service may be spread across multiple servers, where each server includes a portion of the EVFB. In this case, a client may connect to the service and view portions of the EVFB (via the VFB scout associated with the client), which may be contained on separate physical servers.

Additionally, in one embodiment of the invention, the VFB scout may display portions of the EVFB on the client in multiple ways. For example, the client may view the contents of a desktop session in the form of window with a scrollbar. If the client wishes to move to a different view of a particular desktop session, the client may control the VFB scout via the scrollbar. In this manner, the scrollbar reflects the movement of the VFB scout. One skilled in the art will appreciate that there may be several other ways that a client may move the VFB scout (e.g., an overview window which enables the client to click a portion of the desktop session where the VFB scout is moved, a display of a miniature VFB scout which the client may drag to a particular location, etc.).

Figure 2:
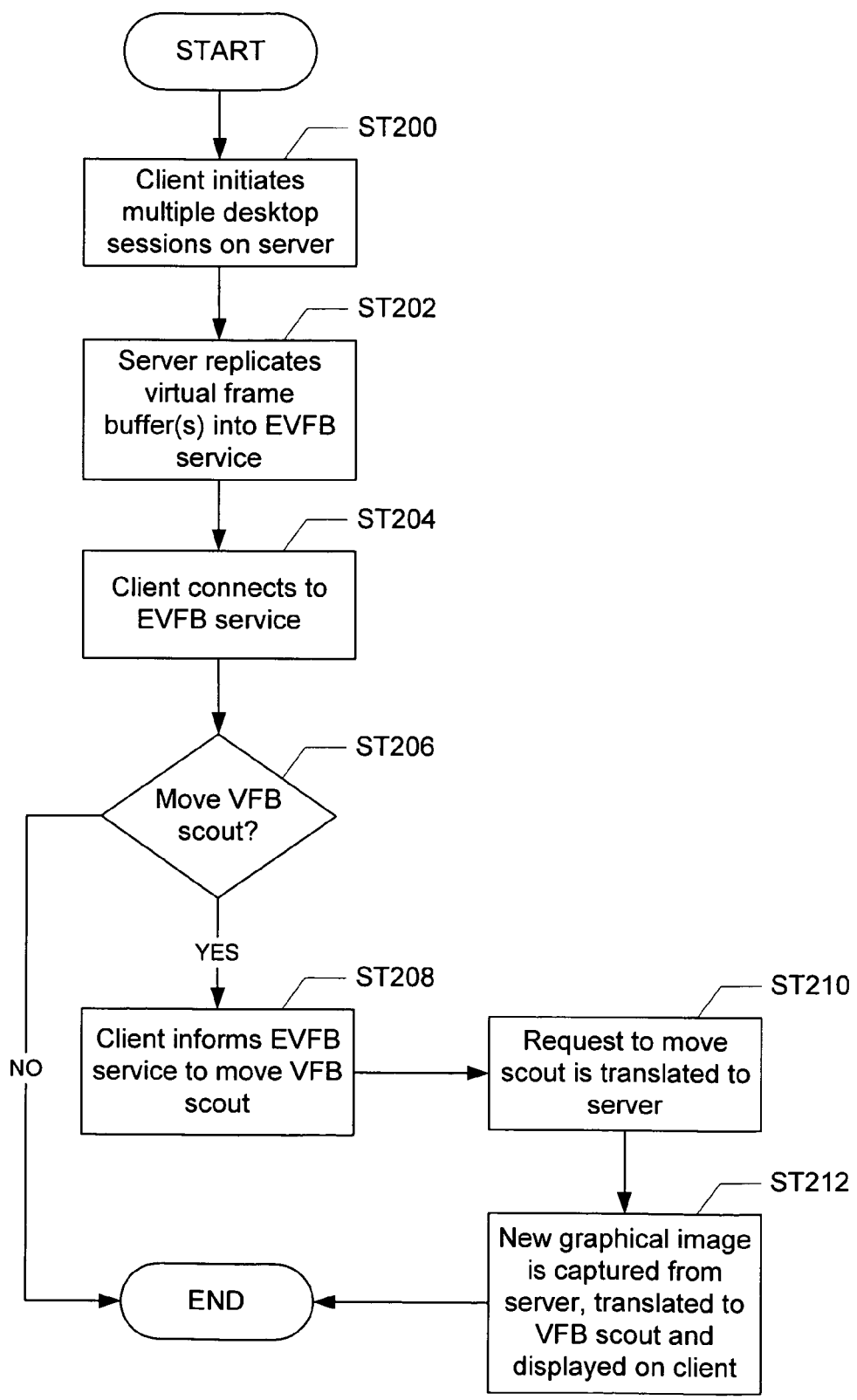
FIG. 2 shows a flow chart for dynamically switching desktop sessions in accordance with an embodiment of the invention.

FIG. 2 shows a flow chart for using an EVFB service in accordance with one embodiment of the invention. Initially, a thin client initiates one or more desktop sessions on a server (Step 200). Subsequently, the server forwards the information from the virtual frame buffer to the EVFB in the EVFB service (Step 202). As noted above, Step 202 may be performed before a client initiates a desktop session. The client may then connect to the EVFB service (Step 204).

At this stage, the client uses the VFB scout to manipulate which part of a particular desktop session to view. Moreover, the client may choose to position the VFB scout so that the scout covers a portion of more than one desktop session. In this manner, the client may simultaneously view more than one desktop session. If the client wishes to move the VFB scout (Step 206), then the client informs the EVFB service to move the VFB scout (Step 208). As noted above, this may be implemented by moving a scrollbar, moving a version of the VFB scout on the client, etc. This request to move the VFB scout is subsequently translated to the server hosting the desktop session (Step 210) and a new graphical image is captured from the server's virtual frame buffer, translated to the VFB scout, and displayed on the client via the client's frame buffer (Step 212).

For example, in one embodiment of the invention, if the client uses a mouse to click within the VFB scout (i.e., to perform some action) on a particular desktop session, the VFB scout is aware of where (within the VFB scout) the client is clicking. This action is subsequently translated to the server that is hosting the particular desktop session and performed using the software on the server. Once the action is completed on the server, the new graphical image (subsequent to the action performed) is captured from the server's virtual frame buffer and translated onto the EVFB in the EVFB service. At this stage, the new graphical image is displayed on the client's screen through the VFB scout associated with the client.

In one embodiment of the invention, inputs from multiple clients may be performed on the same portion of the EVFB. For example, multiple clients may position their VFB scouts on the same portion of the EVFB. In this manner, multiple clients may be viewing the same exact portion of the EVFB. In one embodiment of the invention, if these clients use an input device (e.g., mouse, keyboard) to perform an action in the same portion of the EVFB, then the result may be a merger of the inputs performed. For example, if two clients' VFB scouts are positioned in the same portion of the EVFB, and both clients type characters using a keyboard, then the result of both inputs may be a merger of all the characters typed by both clients. Alternatively, the VFB scout may deal with multiple inputs by translating only one of several inputs performed to the server hosting the desktop session (i.e., the desktop session associated with the portion of the EVFB that is taking in multiple inputs). In this case, one input may take priority (i.e., where one client may hold a higher status than other clients) over any other inputs performed in the same portion of the EVFB. One skilled in the art will appreciate that there may be other ways that the VFB scout handles translating multiple inputs to the server.

In one embodiment of the invention, the EVFB service may be used to allow multiple clients working in a group to view all the desktop sessions initiated by all the clients in the group. This may be implemented, in one embodiment of the invention, by including an application that manages the EVFB service. This application may provide users the ability to see the positions of other VFB scouts associated with the clients in the group. Alternatively, a separate pop-up window may exist that the VFB scout draws within itself to enable the client to view the position of various other client's VFB scout. For example, the EVFB service may provide multiple clients with a radar view of all the VFB scouts within the group of clients working together. This may be implemented by allowing a window that displays all the VFB scouts and allows clients to manipulate each scout. Therefore, clients may see the actions of other clients and manipulate the particular desktop session or VFB scout accordingly. Additionally, in one embodiment of the invention, the client may have a separate window (in addition to the radar view window) that allows only the navigation of the VFB scout associated with the client's desktop sessions. In this manner, several clients collaborating as a group may interface with each other via the EVFB service.

In one embodiment of the invention, in the group scenario discussed above, there may be a mechanism for security implemented regarding accessing multiple desktop sessions. For example, when a client connects to the EVFB service using authentication information, the authentication information may restrict the client's access to only specific portions of the EVFB. More specifically, a client may connect to the EVFB service and have authorized access only to certain desktop sessions within the EVFB service. Alternatively, clients that are working together may use some form of encryption to enable only authorized clients to access the desktop sessions involved in the group collaboration.

Figure 3:
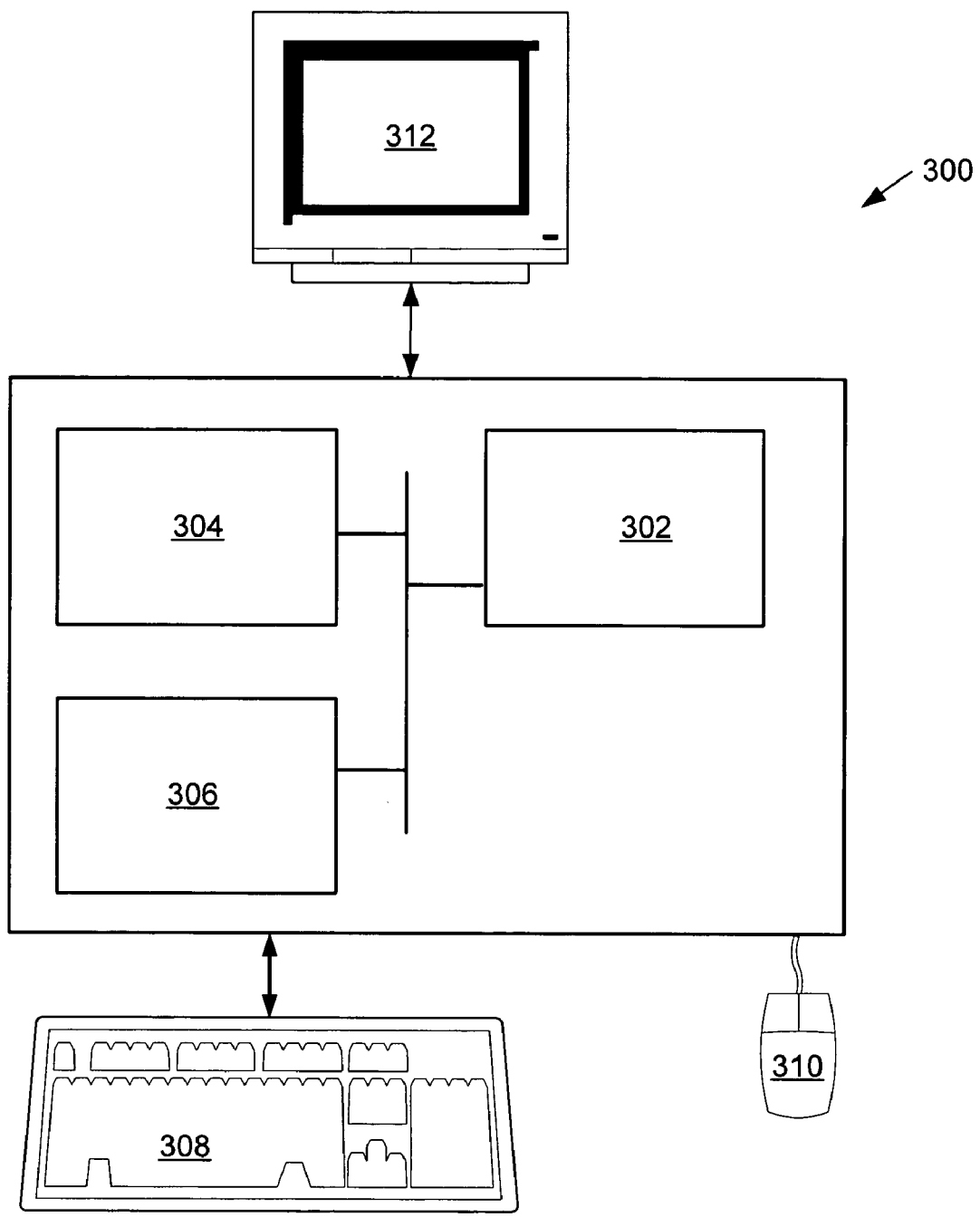
FIG. 3 shows a computer system in accordance with an embodiment of the invention.

The invention may be implemented on virtually any type of computer regardless of the platform being used. For example, as shown in FIG. 3, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer (300) may be located at a remote location and connected to the other elements over a network. Further, the invention may be implemented on a distributed system having a plurality of nodes, where each portion of the invention (e.g., the EVFB, VFB scout, servers, clients, etc.) may be located on a different node within the distributed system. In one embodiment of the invention, the node corresponds to a computer system. Alternatively, the node may correspond to a processor with associated physical memory.

Embodiments of the invention provide the ability for thin clients to dynamically switch between multiple desktop sessions by implementing an extended virtual frame buffer service that offers the contents of multiple desktop sessions displayed in an organized manner. The extended virtual frame buffer service acts as an interface between clients and servers running desktop session so that clients may connect to the interface rather than the servers. This allows clients to view multiple desktop session with one VFB scout displayed on the client. Additionally, embodiments of invention provide an overview "map" of all the desktop sessions which enables users to view and manipulate a desktop session owned by the user or a group owned desktop sessions. This allows clients to collaborate and view multiple desktop sessions While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for viewing a desktop on a first client, comprising:

initiating a first desktop session and a second desktop session;

populating a first virtual frame buffer (VFB) using the first desktop session;

populating a second VFB using the second desktop session;

replicating the first VFB and the second VFB in an extended virtual frame buffer (EVFB);

selecting a first portion of the EVFB to view by positioning a first VFB scout over a portion of the replicated first VFB and a portion of the replicated second VFB in the EVFB; and displaying the first portion of the EVFB on the first client, wherein the first portion of the EVFB comprises the portion of the replicated first VFB and the portion of the replicated second VFB, wherein contents of the portion of the replicated first VFB and the portion of the replicated second VFB are displayed simultaneously, wherein the EVFB comprises a fixed boundary independent of user control of the first VFB scout and between the replicated first VFB and the replicated second VFB, and wherein the fixed boundary is displayed on the first client.

2. The method of claim 1, further comprising:

viewing the first portion of the EVFB on the first client and a second client, using the first VFB scout and a second VFB scout.

3. The method of claim 1, further comprising:

accepting a plurality of inputs from the first client and a second client on the first portion of the EVFB.

4. The method of claim 1, wherein the first client is a thin client.

5. The method of claim 1, further comprising:

selecting a second portion of the EVFB to view using the first VFB scout; and displaying the second portion of the EVFB on the first client.

6. The method of claim 1, further comprising:

selecting a third portion of the EVFB to view using a second VFB scout; and displaying the third portion of the EVFB on a second client.

7. The method of claim 6, wherein the second client is a thin client.

8. The method of claim 6, wherein the EVFB and the second VFB scout are located in an EVFB service.

9. The method of claim 1,
wherein the first desktop session and the first VFB are located in a first server,
wherein the second desktop session and the second VFB are located in a second server, and
wherein the EVFB and the first VFB scout are located in an EVFB service separate from the first server and the second server.

10. The method of claim 1, wherein the fixed boundary between the replicated first VFB and the replicated second VFB joins a first fixed location in the replicated first VFB and a second fixed location in the replicated second VFB, wherein the first fixed location and the second fixed location are displayed on the first client independent of user control of the first VFB scout.

11. A system, comprising:
a first desktop session and a second desktop session, wherein the first desktop session is associated with a first virtual frame buffer (VFB) and the second desktop session is associated with a second VFB;
an extended virtual frame buffer (EVFB) service comprising an extended virtual frame buffer (EVFB) configured to store a copy of the first VFB and a copy of the second VFB;
a first VFB scout covering a first portion of the EVFB comprising a portion of the copy of the first VFB and a portion of the copy of the second VFB; and
a first client configured to display the first portion of the EVFB,
wherein contents of the portion of the copy of the first VFB and the portion of the copy of the second VFB are displayed simultaneously,
wherein the EVFB comprises a fixed boundary independent of user control of the first VFB scout and between the copy of the first VFB and the copy of the second VFB, and
wherein the fixed boundary is displayed on the first client.

12. The system of claim 11, further comprising:
a third desktop session, wherein the third desktop session is associated with a third VFB,
wherein the EVFB is configured to store a copy of the third VFB.

13. The system of claim 11, further comprising:
a second client configured to display a second portion of the EVFB, wherein the second portion is selected by a second VFB scout.

14. The system of claim 13, wherein the second client is a thin client.

15. The system of claim 13, wherein the second portion is selected by moving the second VFB scout in the EVFB.

16. The system of claim 13, wherein the second portion of the EVFB is stored in a frame buffer on the second client.

17. The system of claim 11, wherein the first client is configured to display a third portion of the EVFB, wherein the third portion is selected by moving the first VFB scout in the EVFB.

18. The system of claim 11, wherein the first portion of the EVFB is stored in a frame buffer on the first client.

19. The system of claim 11, wherein the first client is a thin client.

20. The system of claim 11, wherein the first desktop session and the second desktop session are hosted on a single server.

21. The system of claim 11, wherein the fixed boundary between the copy of the first VFB and the copy of the second VFB joins a first fixed location in the copy of the first VFB and a second fixed location in the copy of the second VFB, wherein the first fixed location and the second fixed location are displayed on the first client independent of user control of the first VFB scout.

22. A computer system for viewing a desktop on a client, comprising:
a processor;
a memory;
a storage device; and
software instructions stored in the memory for enabling the computer system under control of the processor, to:
initiate a first desktop session and a second desktop session;
populate a first virtual frame buffer (VFB) using the first desktop session;
populate a second VFB using the second desktop session;
replicate the first VFB and the second VFB in an extended virtual frame buffer (EVFB);
select a portion of the EVFB to view by positioning a VFB scout over a portion of the replicated first VFB and a portion of the replicated second VFB in the EVFB; and
display the portion of the EVFB on the client,
wherein the portion of the EVFB comprises the portion of the replicated first VFB and the portion of the replicated second VFB,
wherein contents of the portion of the replicated first VFB and the portion of the replicated second VFB are displayed simultaneously,
wherein the EVFB comprises a fixed boundary independent of user control of the first VFB scout and between the replicated first VFB and the replicated second VFB, and
wherein the fixed boundary is displayed on the first client.

23. The computer system of claim 22, wherein the fixed boundary between the replicated first VFB and the replicated second VFB joins a first fixed location in the replicated first VFB and a second fixed location in the replicated second VFB, wherein the first fixed location and the second fixed location are displayed on the first client independent of user control of the first VFB scout.

24. A plurality of nodes each comprising a computer processor and interconnected using a computer network, comprising:
a first desktop session and a second desktop session, wherein the first desktop session is associated with a first virtual frame buffer (VFB) in a first node of the plurality of nodes and the second desktop session is associated with a second VFB in a second node of the plurality of nodes;
an extended virtual frame buffer (EVFB) service in a third node of the plurality of nodes and comprising an extended virtual frame buffer (EVFB) configured to store a copy of the first VFB and a copy of the second VFB; and
a client in a fourth node of the plurality of nodes and configured to display a portion of the EVFB comprising a portion of the copy of the first VFB and a portion of the copy of the second VFB,
wherein the portion of the EVFB is selected by positioning a VFB scout to cover the portion of the copy of the first VFB and the portion of the copy of the second VFB,
wherein contents of the portion of the copy of the first VFB and the portion of the copy of the second VFB are displayed simultaneously, wherein the EVFB comprises a fixed boundary independent of user control of the first VFB scout and between the copy of the first VFB and the copy of the second VFB, and wherein the fixed boundary is displayed on the first client.

25. The plurality of nodes of claim 24, wherein the fixed boundary between the copy of the first VFB and the copy of the second VFB joins a first fixed location in the copy of the first VFB and a second fixed location in the copy of the second VFB, wherein the first fixed location and the second fixed location are displayed on the first client independent of user control of the first VFB scout.

* * * * *